United States Patent [19]
Abbasi et al.

[11] Patent Number: 5,724,665
[45] Date of Patent: Mar. 3, 1998

[54] WIRELESS COMMUNICATION BASE STATION

[75] Inventors: Salman Yousef Abbasi, Clifton; Farhad Barzegar, Hillsborough Township, Somerset County; Albert Benzimra, Maplewood; Irwin Gerszberg, Kendall Park; Thomas Gerard Gvoth, Wayne; Eugene Thomas Kendig, Brick Township, Ocean County; Jeffrey Stephen Martin, Dover; Thomas Mark Oplinger, Morristown; Richard F. Pace, Washington; Srini Ramamurthy, Lake Hiawatha; Jesse Eugene Russell, Piscataway; Thomas T. Shen, East Hanover, all of N.J.

[73] Assignee: Lucent Technologies Inc., Murray Hill, N.J.

[21] Appl. No.: 429,215

[22] Filed: Apr. 24, 1995

Related U.S. Application Data

[63] Continuation-in-part of Ser. No. 158,090, Nov. 24, 1993, abandoned.

[51] Int. Cl.[6] .......................................... H04Q 7/30
[52] U.S. Cl. ............................. 455/561; 455/465
[58] Field of Search ............................ 379/58, 59, 60, 379/61, 63; 455/33.1, 33.2, 561, 465

[56] References Cited

U.S. PATENT DOCUMENTS

| | | | |
|---|---|---|---|
| 4,881,271 | 11/1989 | Yamauchi et al. | 379/58 |
| 5,175,867 | 12/1992 | Wejke et al. | 455/33.1 |
| 5,243,642 | 9/1993 | Evans et al. | 379/61 |
| 5,280,630 | 1/1994 | Wang | 379/61 X |
| 5,297,190 | 3/1994 | Ito | 379/59 |
| 5,297,193 | 3/1994 | Bouix et al. | 379/58 |
| 5,499,387 | 3/1996 | Chambert | 455/33.2 |

*Primary Examiner*—Dwayne Bost
*Assistant Examiner*—William G. Trost
*Attorney, Agent, or Firm*—Alfred G. Steinmetz

[57] ABSTRACT

An intelligent wireless communication base station provides communication between individual base stations over an RF radio channel. A control unit in each base station utilizes this communication to facilitate each base station to gather system data regarding the system arrangement of nearby base stations and to facilitate handovers of mobile wireless personal communicators from one base station to a another base station. This control unit is under stored program control and gathers information concerning set up channels of nearby radio ports, a developed list or table of neighbor base stations and signal strength values of nearby channels. Voice channels may be bridged allowing two personal communicators to communicate with each other through a single base station.

3 Claims, 5 Drawing Sheets

WIRELESS COMMUNICATION BASE STATION

This application is a continuation-in-part application Ser. No. 08/158090, filed on Nov. 24, 1993.

FIELD OF THE INVENTION

This invention relates to wireless base stations for communicating with wireless personal communicators and interconnecting these wireless personal communicators through a land line telephone network. It is particularly concerned with a wireless base station that communicates with nearby wireless base stations over a RF airwaves channel.

BACKGROUND OF THE INVENTION

Personal communication systems are wireless radio communication systems that allow a mobile wireless personal communicator (i.e. a radiotelephone) to communicate with another telephone (wireless or wired) through a land line telephone network. The wireless personal communicator communicates with the radio telephones through a radio port that is in turn connected to the land line telephone network.

Radio ports for wireless personal communication systems have tended to be insular communicating only with a land line telephone network and with personal communicators within its immediate service area. For continued service the mobile personal communicator was required to stay within the service area of that one particular radio port. There existed no facility to facilitate hand-off operations such as those in the cellular radiotelephone systems. This is the result of the close tie in to the landline telephone network which had no control facilities to facilitate a hand-off operation from one radio port to another radio port in response to mobility of the mobile wireless personal communicator.

SUMMARY OF THE INVENTION

A wireless base station for providing telephone service to personal communicators also provides communication between individual ones of a plurality of wireless base stations over an RF radio channel. A control unit in each wireless base station utilizes this communication ability to facilitate each wireless base station to gather system data regarding the system arrangement of nearby wireless bases stations and to facilitate handovers of mobile wireless personal communicators from one wireless base station to a another wireless base station. This control unit is under stored program control and gathers information concerning set up channels of nearby wireless base stations, a developed list or table of neighbor wireless base stations and signal strength values of nearby channels.

DETAILED DESCRIPTION

Figure 1:
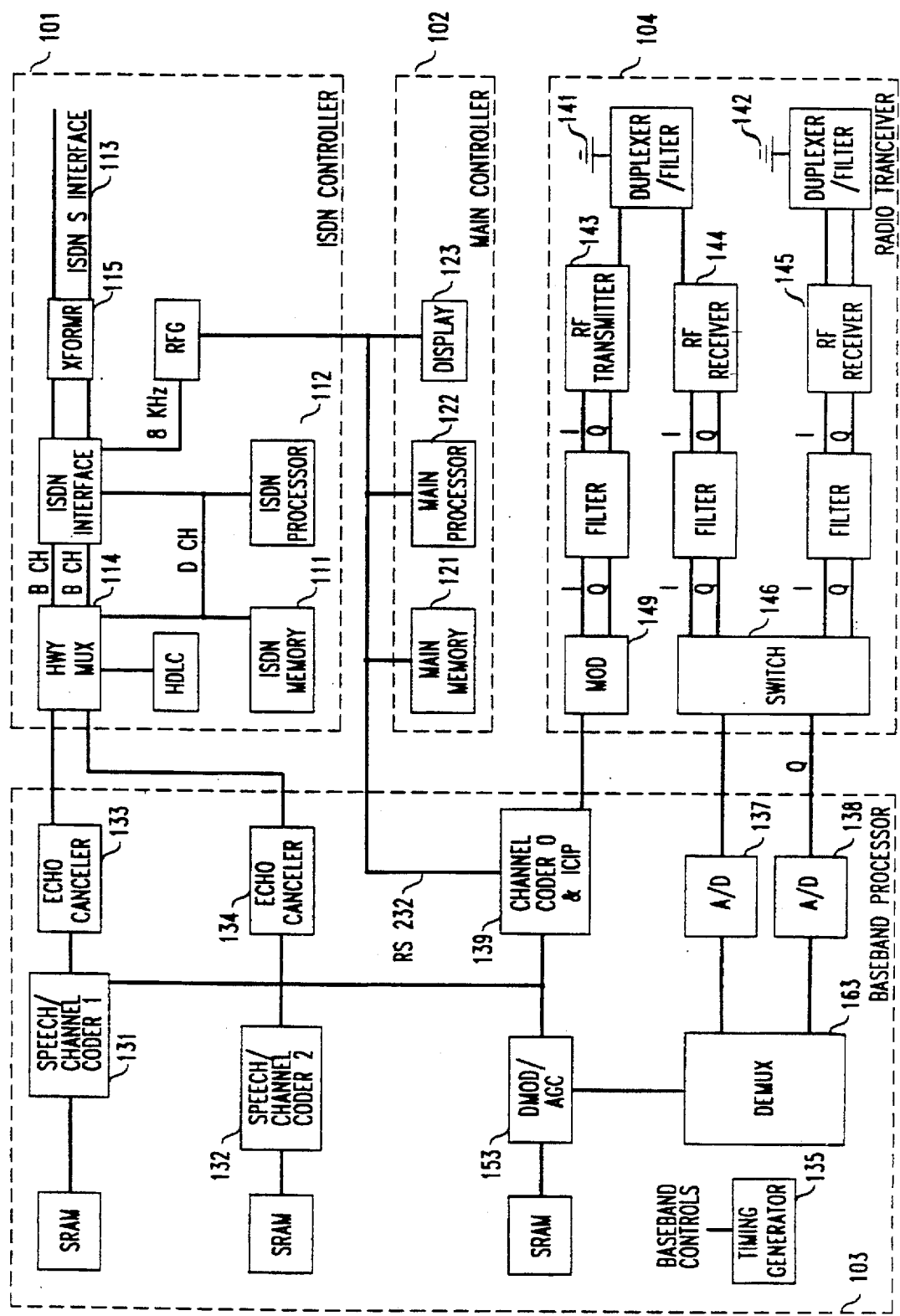
FIG. 1 is a block schematic of an intelligent wireless base station.

An intelligent wireless base station, as shown in the block schematic of FIG. 1 is a wireless-landline interface which is designed to connect to a landline telephone network at the S/T reference point with a connection that is similar or identical to connections used by ordinary telephone subscriber equipment. Landline originated calls intended for a wireless personal communicator device are routed to the wireless base station as if it was a subscriber telephone set. The wireless base station then sets up a wireless call with the intended recipient, if within the operating range of the wireless base station. The wireless base station maintains a database of nearby wireless base stations, also connected to the landline network and their respective channel strengths, and exchanges this information with nearby wireless base stations. This information exchange is used to allow the transfer of calls from one wireless base station to a neighbor wireless base station via a handover process.

This wireless base station includes the main operational modules of an ISDN controller and interface 101, a main controller 102, a baseband processor 103 and a radio transceiver 104. The ISDN controller and interface includes an ISDN memory 111, an ISDN processor 112, an ISDN interface 113, a highway multiplexer 114 and an interface transformer 115. The ISDN interface provides a Basic Rate Interface (BRI) 2B+D connection to the landline telephone network, and which are also shown as connected to the multiplexer 114. The B channels are used for audio or data traffic of the customer and the D channel is used for signaling and user information across the network and for peer-to-peer communications. The ISDN processor 112 controls the highway multiplexer 114.

The baseband processor 103 interconnects audio signals from the ISDN control and interface to the radio transceiver. Audio signals received from the from the ISDN interface are coded, modulated and passed to the radio transceiver 104. The reverse process flow is also performed. It includes speech channel coders 131 and 132 for providing speech and channel coding and which are coupled to the multiplexer 114 of the ISDN controller and interface 101. It also includes echo cancelers 133 and 134 and a baseband timer 135. It is coupled to the radio transceiver 104 by a demodulator 153 and a demultiplexer 163 the A/D converters 137 and 138 and a channel coder 139.

The radio transceiver 104 includes two antennas 141 and 142, and an RF transmitter 143 and two RF receivers 144 and 145. The receivers are connected to the A/D converters 137 and 138 of the baseband processor by a switch 146. The transmitter is connected to an RF modulator 149 which connects it to the baseband processor.

The main controller 102 operates as a communication link between the baseband processor 103 and the ISDN control and interface is a digital interface arrangement and includes a stored program control that controls the overall message flow and processes within the wireless base station. It includes a main memory 121, a main processor 122 and an access unit and display 123. It controls message processing and translations for message flow between the baseband processor 103 and the ISDN control and interface 101. In addition to controlling message processing, it controls system initialization and testing and control of various sub units of the modules such as the radio transceivers modules and the various converters.

Figure 2:
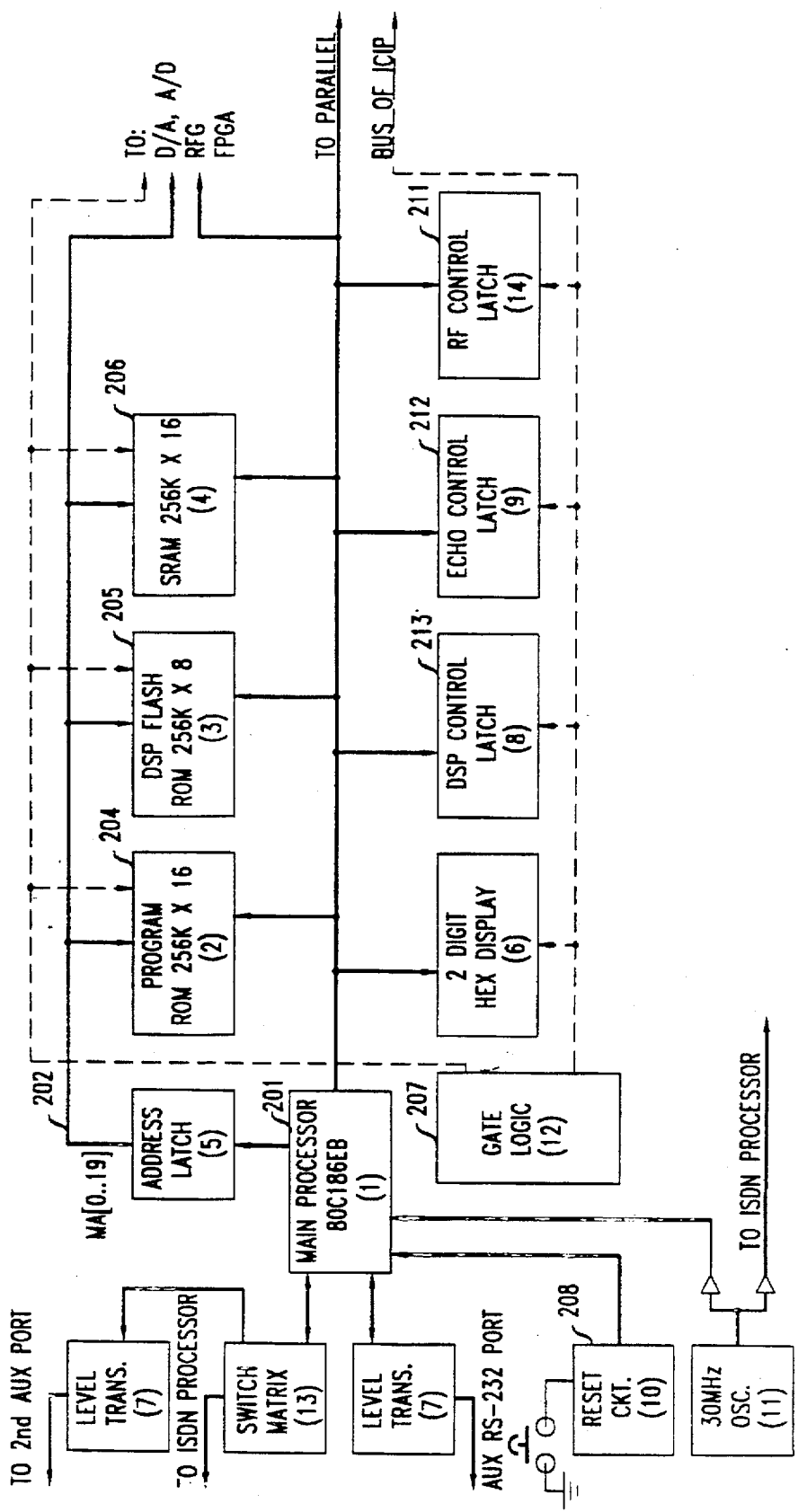
FIG. 2 is a block schematic of the controller of the wireless base station of FIG. 1.

The main controller 102 is disclosed in somewhat more detail in FIG. 2. As shown it includes a main processor unit 201 connected to an address and data buss 202. The processor is supported by the various memory circuits a program memory 204, a flash memory 205, and a static memory 206. Controlling firmware is stored in the flash memory 205 while the static memory 206 stores temporary variables and data.

The gate logic 207 supports the main processor 201 and is used to decode chip selects and strobes. A reset circuit 208 is used for resetting of the system and ins activated during power up. A level translator allows connection to the ISDN processor or to auxiliary ports for purposes of downloading. It may comprise an RS-232 translator.

A plurality of latches 211 212 and 213 are connected to the bus 202. These latches are used to control the RF section, the echo canceler and the system DSPs. The RF control latch 211 enables the main controller to tune the transceiver synthesizers and enable operation of the transmitter and receivers and set the power levels. The DSp control latch controls the reset lines of the system DSPs and controls the radiotelephone functions of the system.

Figure 3:
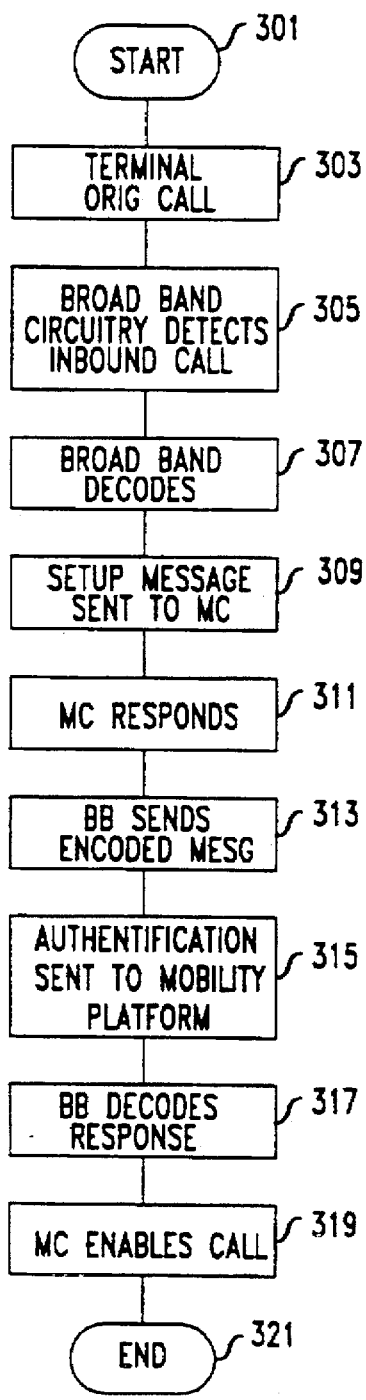
FIGS. 3, 4, 5, and 6 are flow diagrams of processes under the control of the controller of FIG. 2.

The wireless base station provides audio and data communication links between wireless personal communicators, the communication network including the land line telephone network and provides direct communication between nearby wireless base station, via RF signals transmitted over airwaves. The operation of the wireless base station is controlled by the controller and operates in accord with the applicable flow charts illustrated in the FIGS. 3 and 4. The flow chart of FIG. 3 describes the handling of calls originated by a digital terminal. The process begins at the start terminal 301 and the origination of a call by the terminal is shown by the block 303. The RF signals of the originated call are sensed by the antenna of the radio port and the RF signal is processed and transmitted to the baseband circuit of the wireless base station as indicated in block 305. This function includes measuring a strength of the signal and generating a paging message for locating a wireless personal communicator. The baseband circuitry responds to the incoming signal and decodes the signal as indicated in the block 307. A call set-up message is sent to the main controller which responds and provides the instructions to the baseband unit to generate the appropriate set-up signals as indicated in block 311. The baseband circuitry generates and transmits an encoded message which the RF transmitter sends to the mobile terminal originating the call as indicated in the block 313. An authentication request, as indicated in block 315, is controlled by a mobility management scheme which allows several wireless base stations to track a terminal unit without any communication to a data base connected to a switch in the landline network. The response to the authentication request is decoded by the base band circuitry as indicated by block 317. With the proper authentication the main controller performs the instructions to complete the call connection as indicated in block 319. Upon completion of the call the flow terminates in the end terminal 321.

Figure 4:
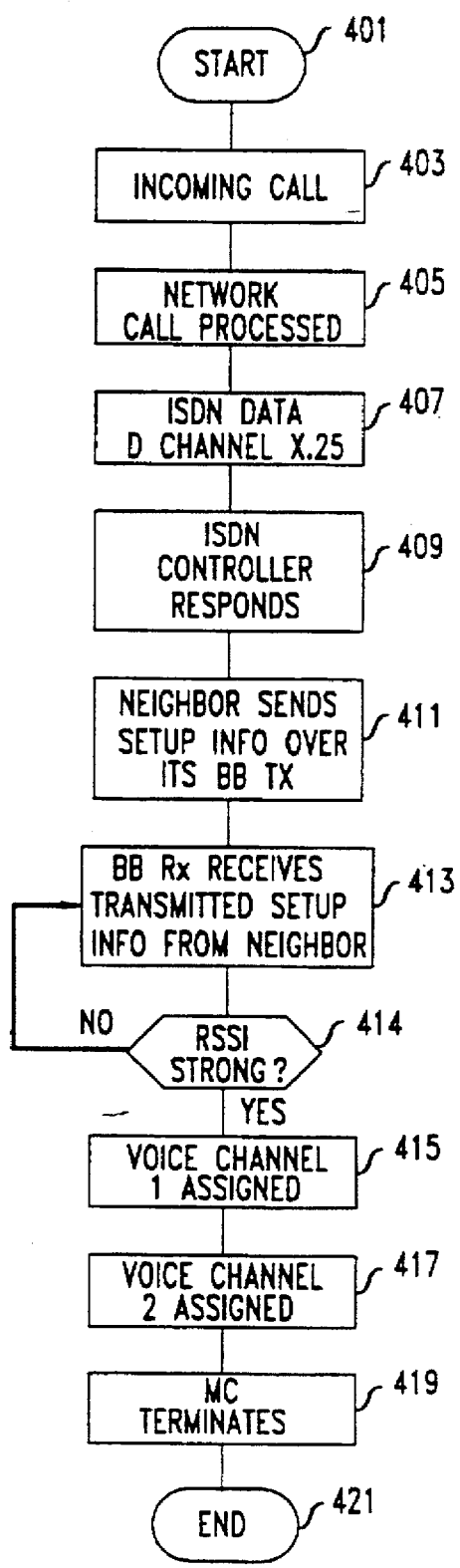

The control of peer-to-peer communications, within the wireless base station is detailed in the flow chart of FIG. 4. The process starting in the start terminal 401 begins by detecting an incoming call as indicated in block 403, such a call is processed as a network call, as indicated in block 405, and the ISDN switch of the landline network is sent data concerning configuring the call by an x.25 protocol as indicated by block 407. A controller of the ISDN responds to this query as specified by block 409 and in block 411 a neighbor wireless base station sends setup information over its baseband driven transmitter. The receiver passes this data to the baseband circuitry which as indicated in block 413 processes it to extract set up information concerning its neighbor from the data. The decision block 414 measures signal strength and if the signal strength is good the flow proceeds to block 415. If it is not the flow returns to the input of block 413 and another set up channel is selected which may be used to effect a handoff/handover of the personal communicator from one wireless communication base station to another base station. First and second voice channels are assigned as specified in the subsequent blocks 417 and 419. This assignment permits a landline and communicator or communicator to communicator to achieve wireless call termination and communicate with one another through the wireless communication base station without being routed through the landline telephone network. At this juncture the main controller terminates the process and the flow ends in the end terminal 421.

The operation of the wireless base station is dependent in part upon the data base in its memory of the identity of neighboring base stations (i.e., an occupied frequency list). As such the base station uses its forward and reverse channels to communicate with mobile units and to communicate with other nearby base stations. In the immediate embodiment the network connection is an ISDN connection and the mobile terminal forward channel need not be used because sufficient data is transmitted in the mobile reverse channel and because of the ability to establish a wired connection through the wired telephone network.

Neighboring base stations or IRPs are located in the frequency spectrum upon connection of the IRP to the network and subsequently updated in the memory of the inquiring IRP by scanning for control signals which may be set up channels and by evaluating the signal strength level of these signals to locate close by stations. Those signals identified control signals are retained in the memory which retains a list of control signals in an order of their signal strength.

The signal strength of the control signals is used to determine the neighbor list and these signals listed are in the illustrative embodiment ordered in correlation to decreasing signal strength above a specific threshold level.

After the initial list of neighboring stations is established in memory the IRP begins to call these neighboring stations over the network and requests the called station to place the calling station on its neighbor list. Each contacted neighbor station then contacts the calling IRP station over the air interface exchanging messages with it to conduct further signal strength tests. After initial contacts these signal interchanges are periodically performed to up date neighbor list in the individual IRPs.

Figure 5:
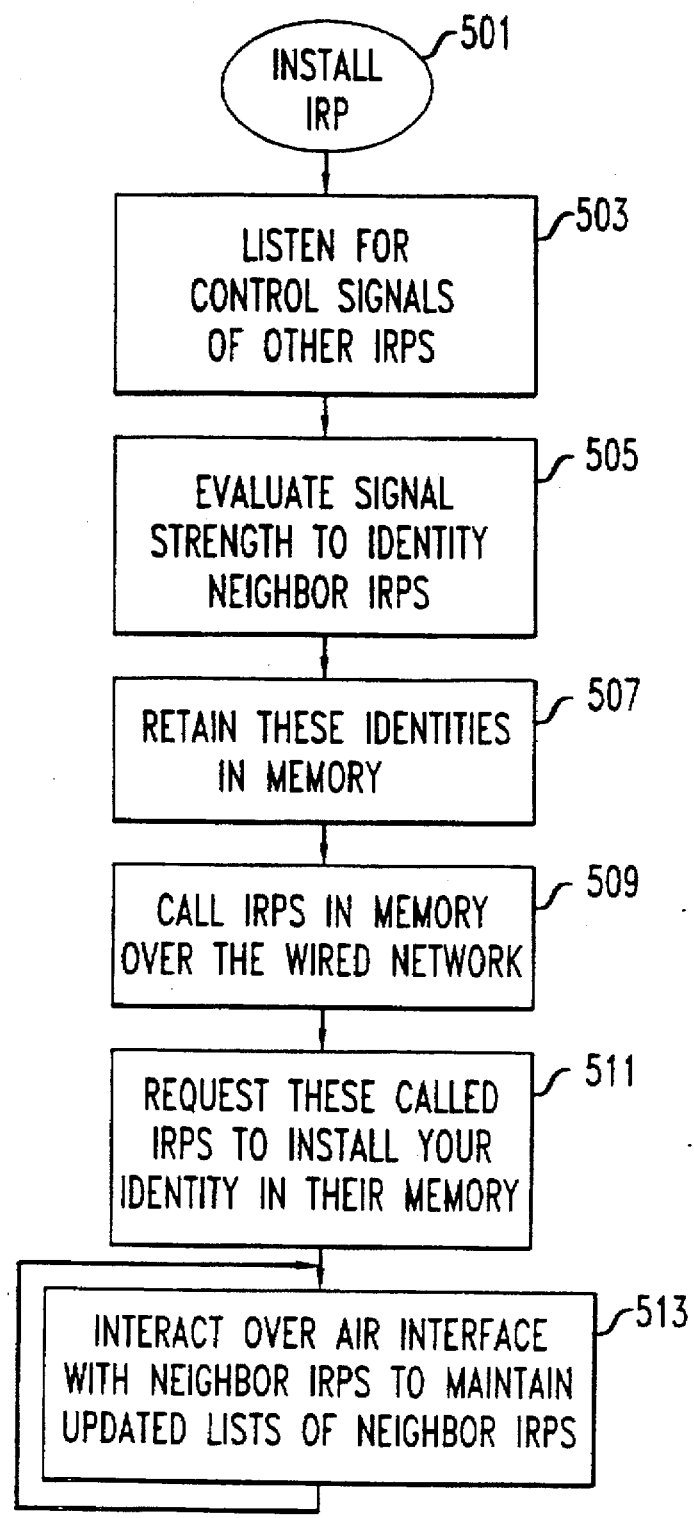

This process is detailed in the data flow chart of FIG. 5 which begins in the terminal 501 when the particular IRP is installed. The subsequent instruction depicted in block 503 command that the IRP scan for control signals (i.e., set up signals). Instructions of the block 505 evaluate the signal strength of these detected control signals. These identities are retained in memory as specified by the instructions of block 507 and utilized to call the identified IRPs over the wired network as specified by the instructions of block 509. These receiving IRPs are commanded to store the identity of the calling IRP in their respective memories as specified by the instructions of the block 511. Subsequently the IRPs on each others list periodically communicate, as per the instructions of block 513, to maintain an updated neighbors list.

Figure 6:
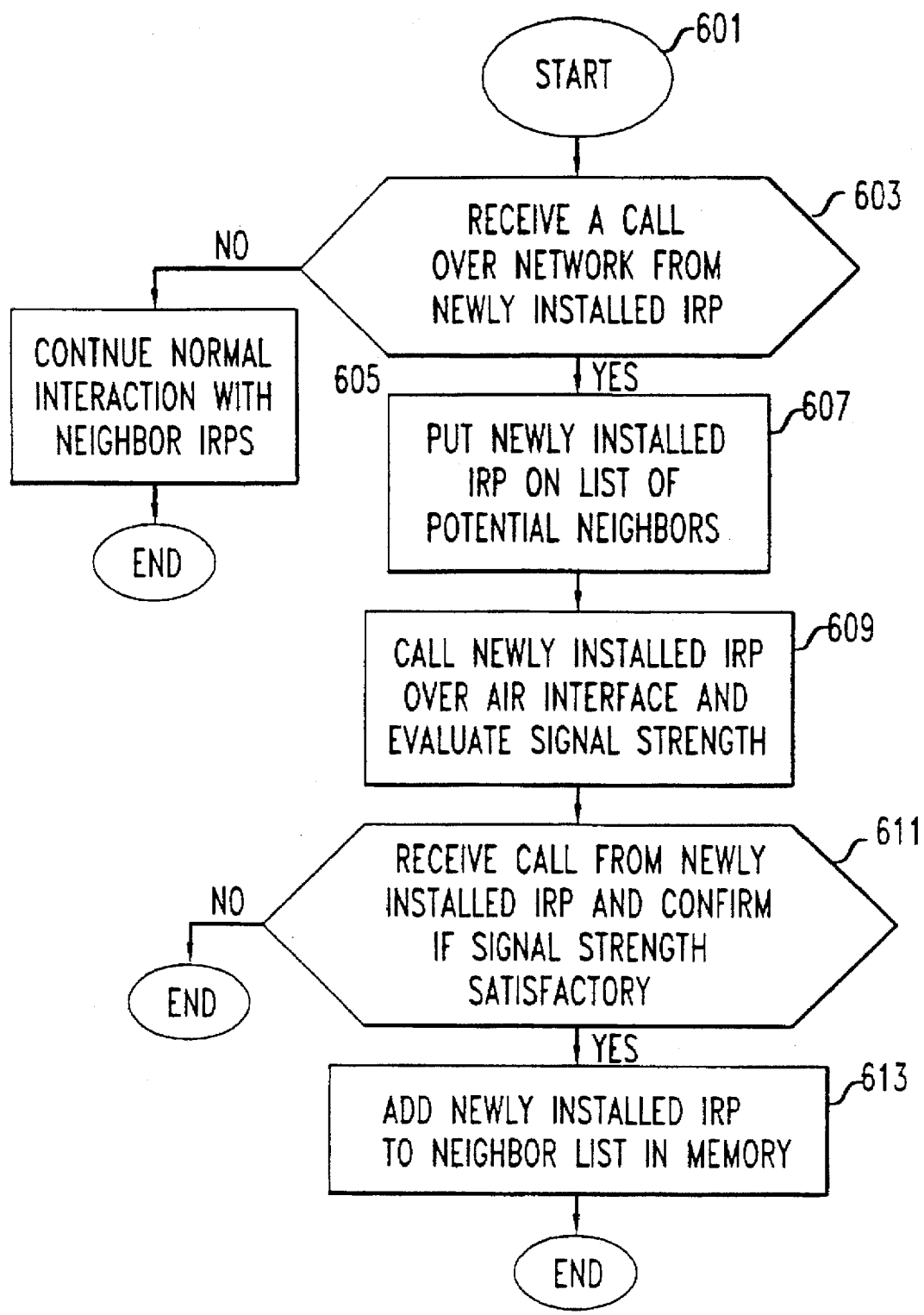

Once installed and having become part of the system of neighboring IRPs each IRP must periodically update its list of neighbors and responds to newly added IRPs. This process is shown in the flow chart of FIG. 6 which begins in terminal 601. Decision block 603 inquires if a call has been received, over the network, from a newly installed IRP. If no such call has been received the flow proceeds to block 605 which commands the IRP to operate in a steady system mode. If such a call is received from the network the instructions of block 607 add that newly installed IRP to the as a potential neighbor. A call is made to the newly added IRP as specified in block 609 in order to measure the signal strength of signals transmitted over the air from the newly added IRP. In block 611 the IRP receives a signal strength measurement and at a level above threshold adds it to its neighbor list as per block 613. The flow process terminates in terminal 615.

We claim:

1. An intelligent wireless communication base station for application to a wireless radio telephone communication system providing personal communication service serving a plurality of mobile wireless personal communicators with a service area including a plurality of neighboring intelligent wireless communication base stations comprising:

a radio transceiver for communicating with mobile wireless personal communicators and with neighboring intelligent wireless communication base stations, a digital interface for communicating with a digital telephone switch included in a land line telephone network;

a controller connected to the radio transceiver and the digital interface for controlling message processing and communications between the intelligent wireless communication base station and the land line telephone network, and with the mobile wireless personal communicators and by wireless communications through the radio transceiver with neighboring intelligent wireless communication base stations, including:

a data processor and a memory, the data processor including a stored control program having the process steps of:

commanding the transceiver to generate set up and control messages;

commanding the transceiver to monitor set up and control channel transmissions of neighboring intelligent wireless communication base stations and determine signal strength measurements of set up signals for control of selecting channels for mobile wireless personal communicator use and further commanding the transceiver to store and update in memory a list of neighboring intelligent wireless communicate base stations and further commanding the transceiver to control exchange through the radio transceiver of set up information with these neighboring intelligent wireless base stations;

commanding the digital interface to send a message to the neighboring intelligent wireless base stations over the land line telephone network, the message containing a request to be included on a neighbor list at the neighboring base station receiving the message;

enable registering of mobile wireless personal communicators in the vicinity of the intelligent wireless communication base station to allow the mobile wireless personal communicators to receive incoming calls from the land line telephone network and direct those calls to wireless personal communicators so registered; and paging mobile wireless personal communicators for facilitation of call set up.

2. An intelligent wireless communication base station for application to a wireless radio telephone communication system providing personal communication service as claimed in claim 1, comprising:

the control program having the further process steps for measuring signal strength of a channel and means for changing channel until a suitable signal strength is attained.

3. An intelligent wireless communication base station for application to a wireless radio telephone communication system as claimed in claim 2, comprising:

results of signal strength measurements are utilized for selecting and identifying neighboring intelligent wireless base stations to be included in the list of neighboring intelligent base stations.

* * * * *